United States Patent
Isenberg

(10) Patent No.: US 6,910,841 B2
(45) Date of Patent: Jun. 28, 2005

(54) THREAD-FORMING SCREW

(75) Inventor: Rainer Isenberg, Iserlohn (DE)

(73) Assignee: ITW Automotive Products GmbH & Co. KG, Iserlohn (DE)

(*) Notice: Subject to any disclaimer, the term of this patent is extended or adjusted under 35 U.S.C. 154(b) by 0 days.

(21) Appl. No.: 10/113,950

(22) Filed: Apr. 2, 2002

(65) Prior Publication Data

US 2002/0146300 A1 Oct. 10, 2002

(30) Foreign Application Priority Data

Apr. 6, 2001 (DE) .......................................... 101 17 171

(51) Int. Cl.[7] .............................................. F16B 25/00
(52) U.S. Cl. .................... 411/386; 411/387.4; 411/412; 411/424
(58) Field of Search ................................. 411/301, 386, 411/387.1–387.8, 412, 424

(56) References Cited

U.S. PATENT DOCUMENTS

| | | | |
|---|---|---|---|
| 2,856,617 A | | 10/1958 | Widmann |
| 3,094,894 A | * | 6/1963 | Bromberg ................. 411/387.4 |
| 4,261,402 A | | 4/1981 | Stanaitis |
| 4,637,767 A | * | 1/1987 | Yaotani et al. ............... 411/411 |
| 5,209,622 A | * | 5/1993 | Kazino et al. .............. 411/386 |
| 5,234,301 A | * | 8/1993 | Grossberndt et al. ....... 411/386 |
| 6,135,892 A | * | 10/2000 | Donovan ...................... 470/10 |
| 6,142,186 A | | 11/2000 | Donovan |
| 6,155,761 A | * | 12/2000 | Donovan .................... 411/386 |
| 6,158,938 A | | 12/2000 | Savoji |
| 6,328,515 B1 | * | 12/2001 | Donovan .................... 411/386 |

FOREIGN PATENT DOCUMENTS

| | | | |
|---|---|---|---|
| DE | 39 22 684 A 1 | 1/1991 | |
| JP | 1-182613 | * 1/1989 | ........... F16B/35/00 |
| WO | WO 98/13606 | 4/1998 | |

OTHER PUBLICATIONS

Patent Abstract of Japanese Publication No. 03272309 A, Published Dec. 4, 1991.
DIN 7500, Oct. 1978, pp. 1–6.

* cited by examiner

Primary Examiner—Lloyd A. Gall
(74) Attorney, Agent, or Firm—Lowe Hauptman & Berner, LLP

(57) ABSTRACT

A thread-forming screw includes a head and a shank, the shank having a thread and a thread-forming zone at the end opposite to the head, the thread-forming zone also having a thread portion. The shank at the end opposite to the head has a spherical portion with a maximum diameter in a plane perpendicular to the axis of the shank which corresponds approximately to the mean diameter of the thread of the shank.

10 Claims, 1 Drawing Sheet

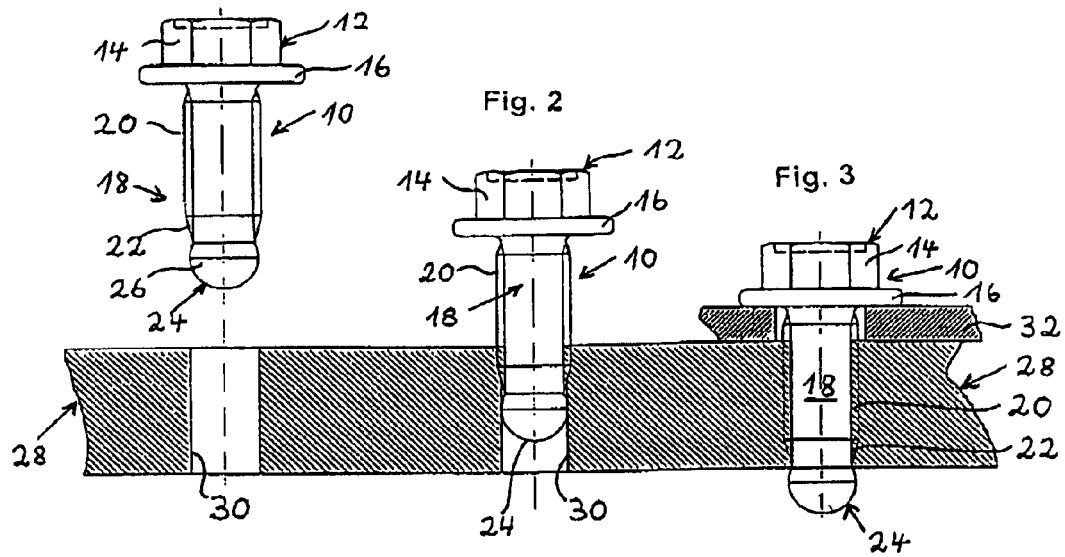
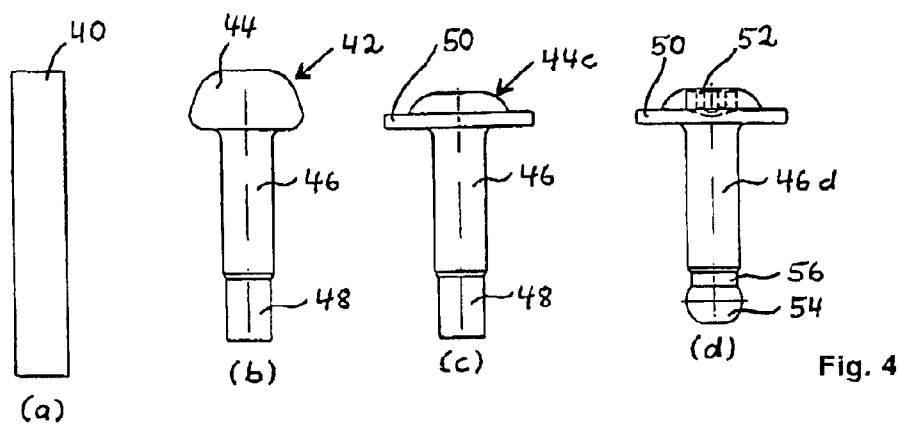

THREAD-FORMING SCREW

TECHNICAL FIELD

The invention refers to a thread-forming screw.

BACKGROUND ART

Thread-forming screws typically are screws having a thread adapted to produce a counter or female thread in a bore of a workpiece. Usually, one differentiates between a tapping and forming thread of a screw. In case of a tapping thread a counter thread is produced in a preformed hole by a chip-generating forming process. In case of a self-forming thread the counter thread is generated substantially without chips through a plastic deformation of the workpiece. In this connection it is known to provide self-forming screws with a thread-generating zone by which particularly effectively a counter thread can be produced. If the workpieces are made of plastic material, the preformed hole or the preformed bore normally has not the core or root diameter of the thread-forming screw, rather, is provided with a greater diameter, preferably with the thread pitch diameter of the thread-forming screw.

For the improved insertion of the thread-forming screw in the preformed bore, the thread-forming screw normally is provided with a first cut or a conical portion by which a centering in the bore is achieved and an easy moving of the threads of a thread-forming portion into the wall of the bore, as well.

Threaded connections with thread-forming screws suffer under undesired release, for example by vibrations. Frequently, such thread-forming screws are pre-assembled with corresponding workpieces, e.g. of synthetic material. In this case, the thread-forming screw is partially turned into the bore of the workpiece. During transportation of such pre-assembled units vibration may occur which may lead to a loosening of the screws from the workpieces. It is known to undertake respective provisions, e.g. by applying micro capsules on the thread. The micro capsules effect an increased friction and thus may avoid an undesired loosening of the screw in the bore. However, the application of such micro capsules is relatively expensive.

SUMMARY OF THE INVENTION

With the invention, a thread-forming screw is to be provided which in the pre-assembled and also in the finally assembled state guarantees a maximum safety against undesired release.

In the thread-forming screw according to the invention the shaft at the end opposite to the head has a spherical portion with a maximum diameter in a plane perpendicular to the axis of the shank which is approximate to the pitch thread diameter of the thread on the shank. The shape of the spherical portion may be different. Essential is that the portion which comes into contact with the wall of the bore is spherical.

According to an embodiment of the invention, the spherical portion may be a section of a ball. According to a further embodiment of the invention, the diameter of the ball section adjacent to the thread-forming zone has the same diameter as the thread-forming zone at this location. The whole spherical portion adjacent to the thread-forming zone may be formed as ball portion.

In case of a pre-assembly with a workpiece consisting of a material suited for a thread-forming process, e.g. plastic material according to an embodiment of the invention the diameter of the bore is approximately equal to the pitch diameter of the thread portion.

Upon insertion of a thread-forming screw according to the invention into the work-piece the spherical portion serves for the centering of the screw shank. Sub-sequently, the thread-forming portion forms a thread into the wall of the bore. In case the maximum diameter of the spherical portion is approximately equal to the diameter of the bore, the spherical portion encounters no considerable resistance during the forming of the thread. Independent from the depth the shank is turned into the bore, the thread-forming screw at any time is sufficiently secured against release. The safety in turning-in direction takes place through the bore portion not yet provided with a thread. The safety in the opposite direction is taken over by the spheri-cal portion. If it is made an attempt to withdraw the thread-forming screw from the bore, this can take place only if the already formed thread is destroyed. This can be only done by applying a considerable force which normally is not generated by vibrations.

If the screw is completely threaded-in so that the spherical portion protrudes beyond the bore in the workpiece, the screw is also protected against release. A safety also against a minimum loosening is achieved only if no substantial gap is between the associated surface of the workpiece and the spherical portion.

The manufacture of a screw according to the invention can take place similar to that for conventional screws. First a blank without thread is produced in a screw press, i.e. with a spherical or ball-shaped extension. Thereafter, a thread is rolled and the spherical portion is rolled into the desired shape. The rolling of the spherical or ball-shaped portion can take place contemporarily with the rolling of the thread in case a specific rolling tool is available.

BRIEF DESCRIPTION OF THE DRAWINGS

An embodiment example is subsequently described in connection with accompanying drawings wherein FIG. 1 shows a thread-forming screw according to the invention outside a workpiece, FIG. 2 shows a thread-forming screw of FIG. 1 partially threaded into a workpiece, FIG. 3 shows a thread-forming screw according to the invention completely threaded into a workpiece, and FIGS. 4a to d show the manufacture of a screw blank.

DETAILED DESCRIPTION OF THE INVENTION

In FIGS. 1 to 3, a thread-forming screw 10 is depicted. It includes a head 12 with a hexagon 14 and a flange 16 adjacent thereto. The screw 10 includes further a shank 18 provided with a thread. In the end portion of thread 20 a thread-forming zone is provided having a conical portion 22. A spherical portion 24 joins to conical portion 22. The diameter of the spherical portion 24 immediately adjacent the conical portion 22 corresponds to the diameter of the conical portion at this location. The maximum diameter of the spherical portion shown at 26 corresponds to the pitch thread diameter of thread 20.

In FIGS. 1 to 3 there is shown a workpiece 28 of plastic material. It includes a throughbore 30 having a diameter which corresponds to the pitch diameter of thread 20.

In the illustration of FIG. 2 it is shown that the thread-forming screw is partially threaded into bore 30. By means of the thread-forming zone (not shown in detail), a thread is formed in the wall of bore 30, i.e. a so-called internal or female screw thread. Correspondingly, the geometry of bore 30 changes. As the ball-shaped portion 24 corresponds to the diameter of bore 30, portion 24 can substantially freely pass bore 30. If upon vibrations a retraction force is exerted onto screw 10 by a back-turning of the screw, this is prevented by the ball-shaped portion 24. In this case, the ball-shaped portion 24 would be pressed against the already formed thread and deform or destroy it. For this, a considerable force is necessary.

In the finally reached position the screw head 12 clamps a plate 32 against work-piece 28 through its flange 16. The ball-shaped portion 24 protrudes out of bore 30, i.e. through its complete extension in axial direction. In other words, the chamfer start 22 terminates at the lower surface of the, workpiece 28. As already explained, by this a safety for screw 10 is achieved.

In FIGS. 4a to 4d a partial manufacture of screw 10 is illustrated. A rod-like blank 40 is pressed and rolled to a pre-form 42 having a head 44 and a shank with a first shank portion 46 and a second shank portion 48 having a reduced diameter. In the next step head 44 is formed to head 44c which has a flange 50 and countersunk wrench surfaces as shown in FIG. 4d. By a further deformation, shank portion 46 is formed to shank portion 46d and shank portion 48 is formed to a ball-shaped extension 54 with a narrowed portion 56 of smaller diameter being formed between shank portion 46d and ball-shaped portion 54. By a subsequent thread-forming, the thread-forming screw is produced as shown in FIGS. 1 to 3. It can be seen that in FIG. 4d the head of the screw differs from that of the screw of FIGS. 1 to 3. In view of shank 18 and the ball-shaped portion, there is conformity with the screw of FIGS. 1 to 3.

As can be seen in FIGS. 1–3, the maximum diameter 26 of portion 24 is greater than the minimum diameter of thread 20 and smaller than the maximum diameter of thread 20.

What is claimed is:

1. In combination,
    a thread-forming screw comprising a head and a shank, the shank having a thread and a thread-forming zone at the end opposite to the head, the thread-forming zone having a tapered thread portion, wherein the shank at the end opposite to the head has an enlarged portion with a maximum diameter, in a plane perpendicular to the axis of the shank, which corresponds approximately to a mean diameter of the thread of the shank; and
    a workpiece of yieldable material, which workpiece has a bore with a diameter which approximately corresponds to the maximum diameter of said enlarged portion;
    said thread-forming screw being threaded into the bore and forming a corresponding internal thread into the wall of the bore, wherein the maximum diameter of the enlarged portion is sized such that withdrawal of said thread-farming screw from said bore will cause said enlarged portion to destroy the internal thread;
    wherein an entire length of said tapered thread portion, as measured along the axis of said shank, is less than an entire depth of said bore.

2. The combination of claim 1, wherein said yieldable material is a plastic material.

3. The combination of claim 1, wherein said bore is a through bore and said thread-forming screw is threaded into said bore so that the enlarged portion protrudes beyond the bore in the workpiece, thereby preventing loosening of said thread-forming screw.

4. The combination of claim 1, wherein said thread of said shank is a cylindrical thread.

5. The combination of claim 1, wherein an entirety of said enlarged portion is ball-shaped.

6. The combination of claim 1, wherein the thread portion of the thread-forming zone is a conical thread portion.

7. The combination of claim 1, further comprising a structural member having a through hole, being placed above the workpiece and fastened to said workpiece by said thread-forming screw;
    wherein the head of said thread-forming screw rests on an upper surface of said structural member, while the enlarged portion protruding beyond the bore in the workpiece and resting on a lower surface of said workpiece, thereby preventing loosening of said thread-forming screw.

8. The combination of claim 7, wherein a diameter of the hole of said structural member is larger than a diameter of the bore of said workpiece and the maximum diameter of said enlarged portion.

9. The combination of claim 1, wherein said thread-forming screw is only partially threaded into said bore of said workpiece and forms a part of said internal thread;
    said enlarged portion of said thread-forming screw being completely received in said bore for preventing loosening of said thread-forming screw due to vibrations.

10. The combination of claim 9, wherein a diameter of the bore of said workpiece is equal to the maximum diameter of said enlarged portion.

* * * * *